(12) United States Patent
Kato

(10) Patent No.: US 11,243,674 B2
(45) Date of Patent: Feb. 8, 2022

(54) DISPLAY APPARATUS AND IMAGE PROCESSING METHOD

(71) Applicant: SEIKO EPSON CORPORATION, Tokyo (JP)

(72) Inventor: Kotaro Kato, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 71 days.

(21) Appl. No.: 16/505,824

(22) Filed: Jul. 9, 2019

(65) Prior Publication Data

US 2020/0019297 A1 Jan. 16, 2020

(30) Foreign Application Priority Data

Jul. 10, 2018 (JP) .............................. JP2018-130464

(51) Int. Cl.
*G06F 3/0484* (2013.01)
*G06F 3/041* (2006.01)
*G06F 3/042* (2006.01)
*G06F 3/0481* (2013.01)

(52) U.S. Cl.
CPC ........ *G06F 3/04842* (2013.01); *G06F 3/0416* (2013.01); *G06F 3/0425* (2013.01); *G06F 3/04817* (2013.01)

(58) Field of Classification Search
CPC ......... G06F 2203/04106; G06F 3/0412; G06F 3/044; G06F 3/0482; G06F 3/04842; G06F 3/04845; G06F 3/04883; G06F 3/1454; G06F 3/03545; G06F 3/0416; G06F 3/0425; G06F 3/04817; H04L 67/10
See application file for complete search history.

(56) References Cited

U.S. PATENT DOCUMENTS 9,110,495 B2 * 8/2015 Zhang ..................... H04N 9/31
9,977,510 B1 * 5/2018 Moffett ................... G06F 3/017
10,198,177 B2 * 2/2019 Watanabe ............. G06F 3/0488
(Continued)

FOREIGN PATENT DOCUMENTS

GB 2536090 A * 9/2016 ............. G06F 21/31
JP H05-282254 A 10/1993
(Continued)

OTHER PUBLICATIONS

T. Hase and M. Matsuda, "A new audio-visual control using message object transmission," in IEEE Transactions on Consumer Electronics, vol. 40, No. 4, pp. 920-926, Nov. 1994, doi: 10.1109/30.338339. (Year: 1994).*
(Continued)

*Primary Examiner* — Asher D Kells
(74) *Attorney, Agent, or Firm* — Oliff PLC

(57) ABSTRACT

A display apparatus includes a display section that displays an image containing one or more objects based on display image data on a display surface, a position generator that generates information representing the position of a mobile terminal that comes into contact with the display surface as terminal position information representing a terminal position in the image, an object identifier that identifies object data on an object corresponding to the terminal position based on the display image data and the terminal position information, and a transmitter that transmits the object data to the mobile terminal.

10 Claims, 13 Drawing Sheets

(56) References Cited

U.S. PATENT DOCUMENTS

| | | | | |
|---|---|---|---|---|
| 2008/0129704 A1* | 6/2008 | Pryor | ................... | G06F 3/0425 345/173 |
| 2008/0231642 A1* | 9/2008 | Okita | ................... | H04L 67/36 345/629 |
| 2008/0248781 A1* | 10/2008 | Cedo Perpinya et al. | ................... | H04B 7/26 455/412.1 |
| 2010/0019972 A1* | 1/2010 | Evans | ................... | G01S 17/87 342/450 |
| 2010/0103330 A1* | 4/2010 | Morrison | ................... | G06F 3/0412 348/744 |
| 2011/0148754 A1* | 6/2011 | Inagaki | ................... | G01S 5/02 345/156 |
| 2011/0294426 A1* | 12/2011 | Matsubara | ................... | H04N 21/478 455/41.2 |
| 2011/0304833 A1* | 12/2011 | Osaka | ................... | H04M 1/0202 353/85 |
| 2012/0127074 A1* | 5/2012 | Nakamura | ................... | G06F 3/0425 345/158 |
| 2012/0306811 A1* | 12/2012 | Farmer | ................... | G06F 3/044 345/174 |
| 2013/0110974 A1* | 5/2013 | Arrasvuori | ................... | G06F 16/176 709/217 |
| 2013/0268894 A1* | 10/2013 | Jeon | ................... | G06F 3/04883 715/835 |
| 2014/0347308 A1* | 11/2014 | Glazer | ................... | G06F 3/0488 345/173 |
| 2015/0029223 A1* | 1/2015 | Kaino | ................... | G09G 3/002 345/633 |
| 2015/0070323 A1* | 3/2015 | Hong | ................... | G06F 3/04162 345/175 |
| 2015/0071648 A1* | 3/2015 | Hong | ................... | H04M 1/72412 398/131 |
| 2015/0234454 A1* | 8/2015 | Kurz | ................... | G06F 3/011 345/156 |
| 2016/0109978 A1* | 4/2016 | Chung | ................... | G06F 3/0481 345/174 |
| 2016/0335242 A1* | 11/2016 | Cheng | ................... | G06F 40/186 |
| 2017/0109121 A1 | 4/2017 | Tsubone | | |
| 2017/0293214 A1* | 10/2017 | Masuoka | ................... | G06T 3/0012 |
| 2018/0061262 A1* | 3/2018 | Nakashin | ................... | G09B 5/02 |
| 2019/0102135 A1* | 4/2019 | Lai | ................... | G06K 7/1413 |
| 2019/0384153 A1* | 12/2019 | Huang | ................... | G03B 35/20 |

FOREIGN PATENT DOCUMENTS

| | | |
|---|---|---|
| JP | H10-275134 A | 10/1998 |
| JP | 2007-316925 A | 12/2007 |
| JP | 2017-76207 A | 4/2017 |

OTHER PUBLICATIONS

S. Takino, ""GIS on the fly" to realize wireless GIS network by Java mobile phone," Proceedings of the Second International Conference on Web Information Systems Engineering, Kyoto, Japan, 2001, pp. 76-81 vol. 2, doi: 10.1109/WISE.2001.996711. (Year: 2001).*

X. Bao, H. Bie and M. Wang, "Integration of multimedia and location-based services on mobile phone tour guide system," 2009 IEEE International Conference on Network Infrastructure and Digital Content, Beijing, 2009, pp. 642-646, doi: 10.1109/ICNIDC.2009.5360805. (Year: 2009).*

Seewoonauth, Khoovirajsingh, et al. "Two nfc interaction techniques for quickly exchanging pictures between a mobile phone and a computer." Proceedings of the 11th International Conference on Human-Computer Interaction with Mobile Devices and Services. 2009.*

Simeone, Adalberto L., et al. "A cross-device drag-and-drop technique." Proceedings of the 12th International Conference on Mobile and Ubiquitous Multimedia. 2013.*

* cited by examiner

DISPLAY APPARATUS AND IMAGE PROCESSING METHOD

The present application is based on, and claims priority from JP Application Serial Number 2018-130464, filed Jul. 10, 2018, the disclosure of which is hereby incorporated by reference herein in its entirety

BACKGROUND

1. Technical Field

The present disclosure relates to a display apparatus and a image processing method.

2. Related Art

There is a known technology for displaying an image saved in a digital camera or a mobile terminal on a display apparatus, such as a television monitor. JP-A-2007-316925 discloses an image display method for sensing whether or not a mobile terminal is in contact with the display surface of a display apparatus and attaching an attachment image transmitted from the mobile terminal to the display apparatus to the location where the mobile terminal is in contact with the display apparatus.

JP-A-2007-316925 is an example of the related art.

The related art allows an image stored in the mobile terminal to be displayed on the display apparatus, however, when one or more objects are displayed on the display apparatus, the related art does not allow the mobile terminal to acquire a desired object.

SUMMARY

A display apparatus according to an aspect of the present disclosure includes a display section that displays an image containing one or more objects based on display image data on a display surface, a position generator that generates information representing a position of a mobile terminal that comes into contact with the display surface as terminal position information representing a terminal position in the image, an object identifier that identifies object data on an object corresponding to the terminal position based on the display image data and the terminal position information, and a transmitter that transmits the object data to the mobile terminal.

An image processing method according to another aspect of the present disclosure includes displaying an image containing one or more objects based on display image data on a display surface, generating information representing a position of a mobile terminal that comes into contact with the display surface as terminal position information representing a terminal position in the image, identifying object data on an object corresponding to the terminal position based on the display image data and the terminal position information, and transmitting the object data to the mobile terminal.

DESCRIPTION OF EXEMPLARY EMBODIMENTS

Figure 1:
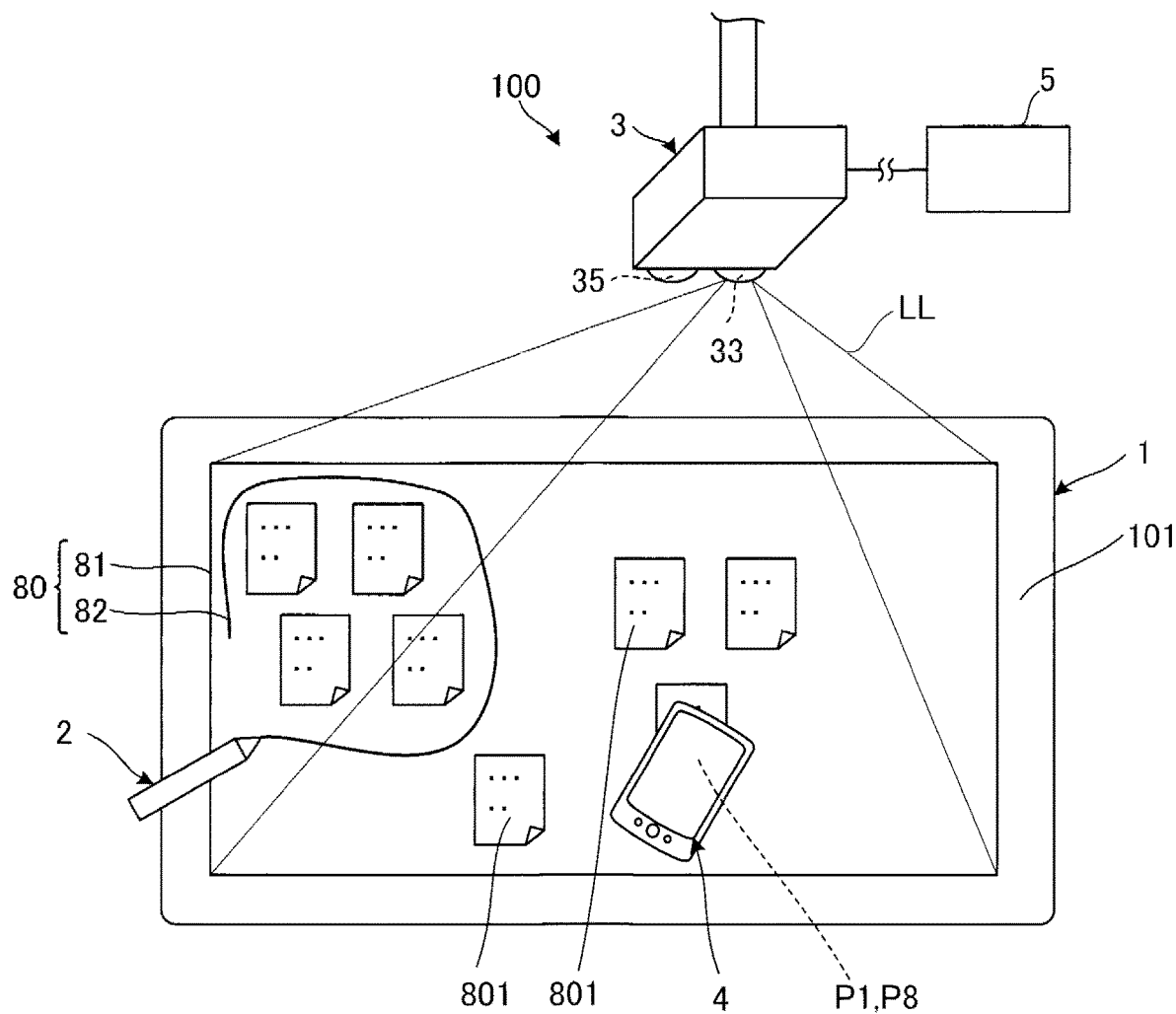
FIG. 1 is a schematic view showing a projector system in a first embodiment.

Preferable embodiments according to the present disclosure will be described below with reference to the accompanying drawings. In the drawings, the dimension and scale of each portion differ from actual values as appropriate, and some portions are diagrammatically shown for ease of understanding. The scope of the present disclosure is not limited to the embodiments unless the following description particularly states that the restrictions are imposed on the present disclosure.

1. First Embodiment

A projector system 100 will be described as an example of a display system including a display apparatus according to the present disclosure.

1-1. Configuration of Projector System

FIG. 1 is a schematic view showing the projector system 100 in the first embodiment. The overall configuration of the projector system 100 will first be briefly described.

The projector system 100 shown in FIG. 1 includes a screen 1, installed on a wall or any other surface, a projector 3, which is installed above the screen 1, an electronic pen 2, and a mobile terminal 4. The screen 1 and the projector 3 are an example of a display apparatus that displays an image. The mobile terminal 4 is, for example, a smartphone, a tablet terminal, or any other portable information terminal. The screen 1, the projector 3, and the mobile terminal 4 each have a communication function and can communicate with each other. The projector 3 can communicate with an external apparatus 5, such as a personal computer.

In the thus configured projector system 100, the projector 3 enlarges and projects projection light LL on a display surface 101 of the screen 1 to display a projection image 80, which is an example of an "image." The projection image 80 contains a plurality of objects 801, which are formed, for example, of letters or figures.

The projector 3 has what is called an interactive function and can draw the trajectory of the tip of the electronic pen 2 on the projection image 80. That is, the projector 3 can display a first image 81 based on data received from the external apparatus 5 and a second image 82 based on the trajectory of the electronic pen 2 in such a way that the first image 81 and the second image 82 are superimposed on each other on the display surface 101.

Further, in the projector system 100, when a user causes the mobile terminal 4 to come into contact with or approach the screen 1, object data on a desired object 801 out of the plurality of objects 801 contained in the projection image 80 can be transferred to the mobile terminal 4. Further, when the user causes the mobile terminal 4 to come into contact with or approach the screen 1, the object 801 stored in the mobile terminal 4 can be displayed as part of the projection image 80. That is, the user can attach and detach an object 801, which is part of the projection image 80, to and from the projection image 80 as if the object 801 were a sticky paper note by causing the mobile terminal 4 to come into contact with or approach the screen 1.

In the above description, the location where the screen 1 is installed is a wall, but the installation location is not limited to a wall and may, for example, be a floor, a table, or any other arbitrary installation location. The projector 3 only needs to be capable of projecting the projection image 80 onto the display surface 101, and the location where the projector 3 is installed is not limited to a ceiling and may instead be the screen 1, a wall, a floor, a table, or any other arbitrary installation location.

Figure 2:
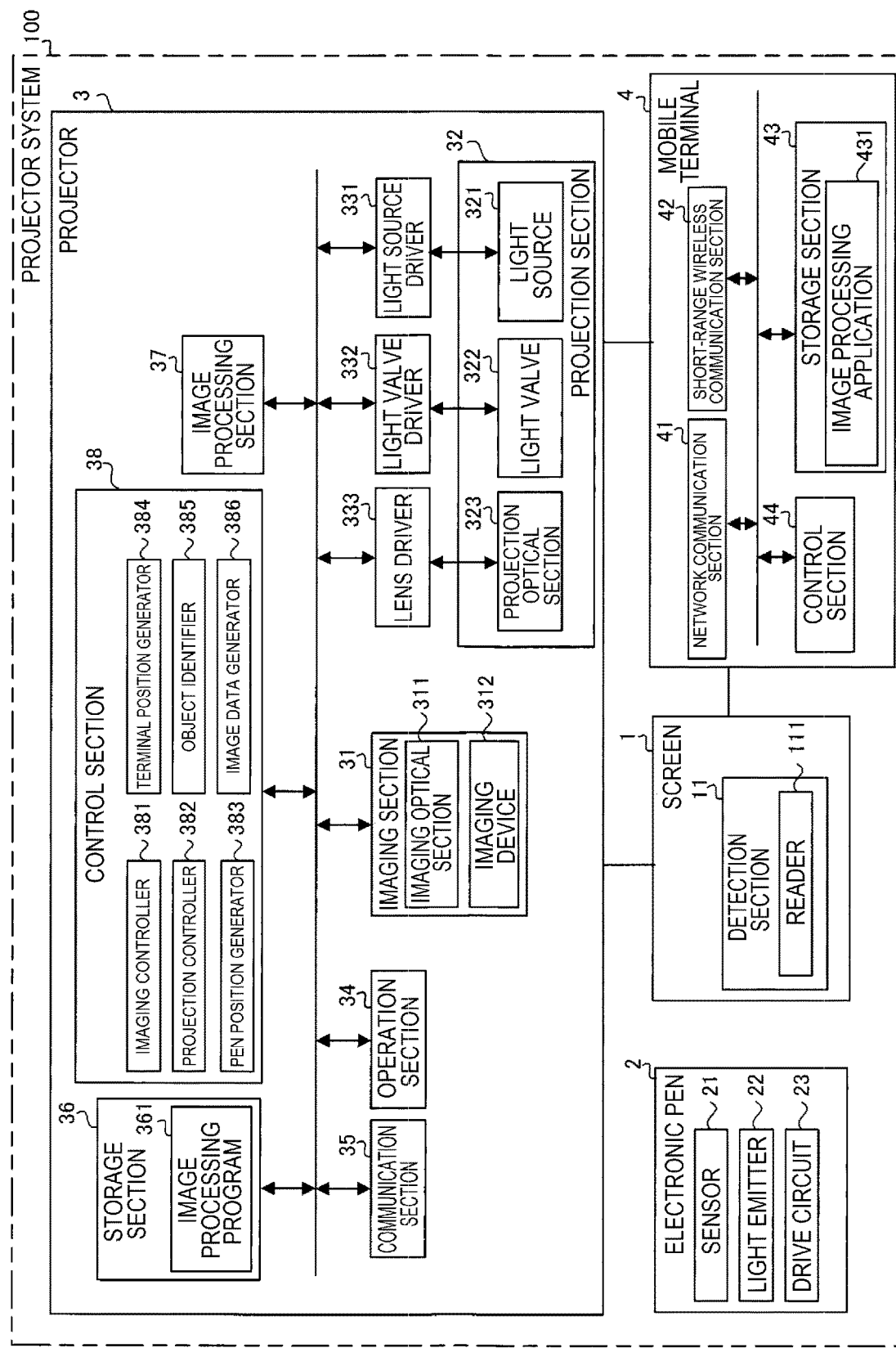
FIG. 2 is a block diagram showing the projector system in the first embodiment.

The configurations of the portions of the projector system 100 will next be described in detail with reference to FIGS. 1 and 2. FIG. 2 is a block diagram showing the electrical configuration of the projector system 100 in the first embodiment.

1-1a. Electronic Pen

The electronic pen 2 shown in FIG. 2 includes a sensor 21, a light emitter 22, and a drive circuit 23. The sensor 21 is, for example, a pressure sensitive sensor based on electrostatic capacitance. The light emitter 22 is, for example, a light emitting device, such as an infrared light emitting diode. The sensor 21 and the light emitter 22 are provided at the tip of the electronic pen 2. The drive circuit 23 drives the light emitter 22. Although not shown, the electronic pen 2 includes a primary battery or a secondary battery. In the thus configured electronic pen 2, when the sensor 21 detects that the electronic pen 2 has come into contact with the display surface 101, the drive circuit 23 causes the light emitter 22 to emit light.

1-1b. Projector

The projector 3 includes an imaging section 31, a projection section 32, a light source driver 331, a light valve driver 332, a lens driver 333, an operation section 34, a communication section 35, a storage section 36, an image processing section 37, and a control section 38, as shown in FIG. 2. The projection section 32 functions as a display section that displays an image containing one or more objects on the display surface 101. The communication section 35 functions as a transmitter that transmits the object data to the mobile terminal 4.

The imaging section 31 is a camera that captures an image of the display surface 101. The imaging section 31 captures an image of letters, a figure, or the like drawn on the display surface 101, for example, with the light from the electronic pen 2. The imaging section 31 includes an imaging optical section 311, which includes a lens and other components, and an imaging device 312, which converts light collected by the imaging optical section 311 into an electric signal. The imaging device 312 is sensitive to the infrared and visible light wavelength range. The imaging device 312 is, for example, a CCD (charge coupled device) image sensor or a CMOS (complementary metal oxide semiconductor) image sensor. The imaging section 31 further includes an infrared filter that transmits light that belongs to the infrared light wavelength range but no light that belongs to the visible light wavelength range and a movable mechanism that can move the infrared filter in accordance with a control signal. The movable mechanism can move the infrared filter into the optical path of the light incident on the imaging device 312 and move the infrared filter in such a way that the optical path of the incident light does not intersect the infrared filter. To detect the trajectory of the electronic pen 2, the control section 38 controls the movable mechanism in such a way that the infrared filter is moved into the optical path. Imaging via the infrared filter allows detection of the trajectory of the electronic pen 2 at a high SN ratio. To perform calibration, which will be described later, the control section 38 controls the mechanism in such a way that the optical path does not intersect the infrared filter. An imaging coordinate system specified by axes U and V perpendicular to each other is set as the coordinate system of an image captured by the imaging section 31.

The projection section 32 outputs the projection light LL to the screen 1 to display the projection image 80 on the display surface 101. The projection section 32 includes a light source 321, a plurality of light valves 322, and a projection optical section 323. Examples of the light source 321 may include a xenon lamp, an ultrahigh-pressure mercury lamp, an LED (light emitting diode), and a laser light source. The light valves 322 are each formed, for example, of a liquid crystal panel in which a liquid crystal layer is disposed between a pair of transparent substrates. The projection optical section 323 includes, for example, a zoom lens that performs to change focal length.

In the projection section 32, the light valves 322 modulate the light emitted from the light source 321 to form the projection light LL, and the projection optical section 323 enlarges and projects the projection light LL. The enlarged, projected projection light LL is focused on the display surface 101 to display the projection image 80 on the display surface 101. A projection coordinate system specified by axes X and Y perpendicular to each other is set as the coordinate system of the projection image 80. The projection image 80 is formed of the light passing through the light valves 322. The projection coordinate system is therefore a coordinate system of an image expressed by an image signal supplied from the image processing section 37 to the projection section 32. A display coordinate system specified by axes W and Z perpendicular to each other is set as the coordinate system of the display surface 101.

Since the trajectory of the electronic pen 2 is detected based on an image captured by the imaging section 31, the trajectory of the electronic pen 2 is given in the imaging coordinate system. On the other hand, an object contained in the projection image 80 projected by the projector 3 is specified by the projection coordinate system. To allow the trajectory of the electronic pen 2 to be contained as an object in the projection image 80, coordinates in the imaging coordinate system needs to be converted into those in the projection coordinate system.

In the projector system 100, out of the plurality of objects 801 contained in the projection image 80, object data on an object positioned at a location where the mobile terminal 4 is in the vicinity of or in contact with the display surface 101 is transferred from the projector 3 to the mobile terminal 4, as described above. To this end, it is necessary to detect the position of the mobile terminal 4 on the display surface 101 in the display coordinate system, convert the detected position into a position in the projection coordinate system, and identify an object located in the converted coordinates.

The projector 3 has a coordinate conversion function of converting the imaging coordinate system into the projection coordinate system and a coordinate conversion function of converting the display coordinate system into the projection coordinate system.

The light source driver 331 is a drive circuit that drives the light source 321. The light valve driver 332 is a circuit that drives the light valves 322. The lens driver 333 is a circuit that changes the enlargement factor and other parameters of the projection optical section 323.

The operation section 34 is provided on the exterior of the projector 3 and includes buttons or a touch panel that receives the user's instruction. For example, the light source driver 331 described above, when it receives the user's operation performed on the operation section 34, causes the light source 321 to emit light. The operation section 34 may, for example, be a remote control.

The communication section 35 transmits and receives data to and from the screen 1, the mobile terminal 4, and the external apparatus 5 via a network, such as the Internet and a wireless LAN. The communication section 35 includes a network interface.

The storage section 36 is a recording medium readable by the control section 38, which will be described later, and stores a plurality of programs and a plurality of sets of data. The storage section 36 is formed, for example, of one or more of a ROM (read only memory), a RAM (random access memory), and other storage circuits. The storage section 36 stores an image processing program 361 relating to image processing, which will be described later. The storage section 36 further stores image data received via the communication section 35. The storage section 36 further stores a coordinate conversion equation for conversion between coordinates (u, v) in the imaging coordinate system that are outputted by the imaging section 31 and coordinates (x, y) in the projection coordinate system of the projection image 80 displayed by the projection section 32, a coordinate conversion equation for conversion between coordinates (w, z) in the display coordinate system on the display surface 101 of the screen 1 and coordinates (x, y) in the projection coordinate system of the projection image 80, and the like.

The image processing section 37 is, for example, a processor, such as a CPU (central processing unit) and produces an image signal based on the image data stored in the storage section 36. The light valve driver 332 described above drives the light valves 322 based on the image signal produced by the image processing section 37.

The controller 38 is, for example, a processor, such as a CPU (central processing unit). The control section 38 executes the image processing program 361 stored in the storage section 36 to function as an imaging controller 381, a projection controller 382, a pen position generator 383, a terminal position generator 384 as a "position generator," an object identifier 385, and an image data generator 386.

The imaging controller 381 controls the imaging operation performed by the imaging section 31 described above. The control performed by the imaging controller 381 allows the imaging section 31 described above to repeatedly capture an image of the display surface 101 to produce time-series captured images.

The projection controller 382 controls the drive operation of the light source driver 331, the light valve driver 332, and the lens driver 334 described above. When the light source driver 331 and the lens driver 334 are driven and the light valve driver 332 is driven based on the image signal produced by the image processing section 37 under the control of the projection controller 382, the projection section 32 displays the projection image 80 on the display surface 101.

The pen position generator 383 uses the coordinate conversion equation for conversion between the imaging coordinate system and the projection coordinate system to convert the position of the tip of the pen in the imaging coordinate system into the position of the tip of the pen in the projection coordinate system.

The terminal position generator 384 uses the coordinate conversion equation for conversion between the display coordinate system and the projection coordinate system to convert a contact position P1, which is the position of the mobile terminal 4 given in the display coordinate system, into a terminal position P8, which is the position of the mobile terminal 4 in the projection coordinate system. Further, the terminal position generator 384 generates terminal position information representing the terminal position P8. The contact position P1 is the position of the mobile terminal 4 on the display surface 101, and the terminal position P8 is the position of the mobile terminal 4 in the projection image 80. The conversion allows the user to grasp the correspondence between the position of the mobile terminal 4 in the vicinity of or in contact with the display surface 101 and the position of the mobile terminal 4 in the projection image 80.

The object identifier 385 identifies object data on an object 801 corresponding to the terminal position P8, out of the plurality of objects 801 contained in the projection image 80, based on the terminal position P8 determined by the terminal position generator 384 and display image data. The object identifier 385 determines an object identification range A8 corresponding to the terminal position P8 to identify the object data. The object identification range A8 will be described in a later description of the image processing.

The image data generator 386 generates the display image data on the projection image 80 containing the trajectory of the electronic pen 2 based on the position of the electronic pen 2 in the projection coordinate system determined by the pen position generator 383 and the image data stored in the storage section 36. The display image data is formed of one or more sets of object data. The object data sets each specify the content of the object and the position where the object should be displayed in the projection image 80. When a first object is a photograph, first object data representing the first object is, for example, data in the JPEG format and has a position that represents the display range of the first object expressed in the projection coordinate system. When a second object is a text, second object data representing the second object is, for example, text data representing the text and has a position that represents the display range of the second object expressed in the projection coordinate system.

Identification of coordinates in the projection coordinate system therefore allows identification of object data containing the identified coordinates in the display range based on the display image data.

The image data generator 386 further generates post-cutting-process image data excluding the identified object data from the display image data on the projection image 80 based on the object data identified by the object identifier 385 and the display image data. The image data generator 386 still further generates, based on object data transmitted from the mobile terminal 4 and received via the communication section 35 and the display image data, post-attaching-process image data to which the object data is added. The display image data, the post-cutting-process image data, and the post-attaching-process image data generated by the image data generator 386 are stored in the storage section 36.

1-1c. Mobile Terminal

The mobile terminal 4 is, for example, a smartphone, a tablet terminal, or any other portable information terminal, as described above. The mobile terminal 4 includes a network communication section 41, a short-distance wireless communication section 42, a storage section 43, and a control section 44.

The network communication section 41 includes a network interface and transmits and receives data to and from the projector 3 via a network, such as the Internet and a wireless LAN. The short-distance wireless communication section 42 is formed of a short-distance wireless tag and communicates with a detection section 11 of the screen 1, which will be described later, over short-distance wireless communication. The short-distance wireless tag is a non-contact electronic tag having a communicable range of about several centimeters and corresponding, for example, to NFC (near field communication) or ISO/IEC 14443.

The storage section 43 is a recording medium readable by the control section 44. The storage section 43 stores an image processing application 431 relating to the image processing described later. The control section 44 is, for example, a processor, such as a CPU (central processing unit), and can issue an instruction relating to the image processing to the projector 3 by executing the image processing application 431.

1-1d. Screen

The screen 1 includes a detection section 11. The detection section 11 detects the position of the mobile terminal 4 which approaches or comes into contact with the display surface 101 and outputs information on the contact position P1 of the mobile terminal 4 in the display coordinate system.

Figure 3:
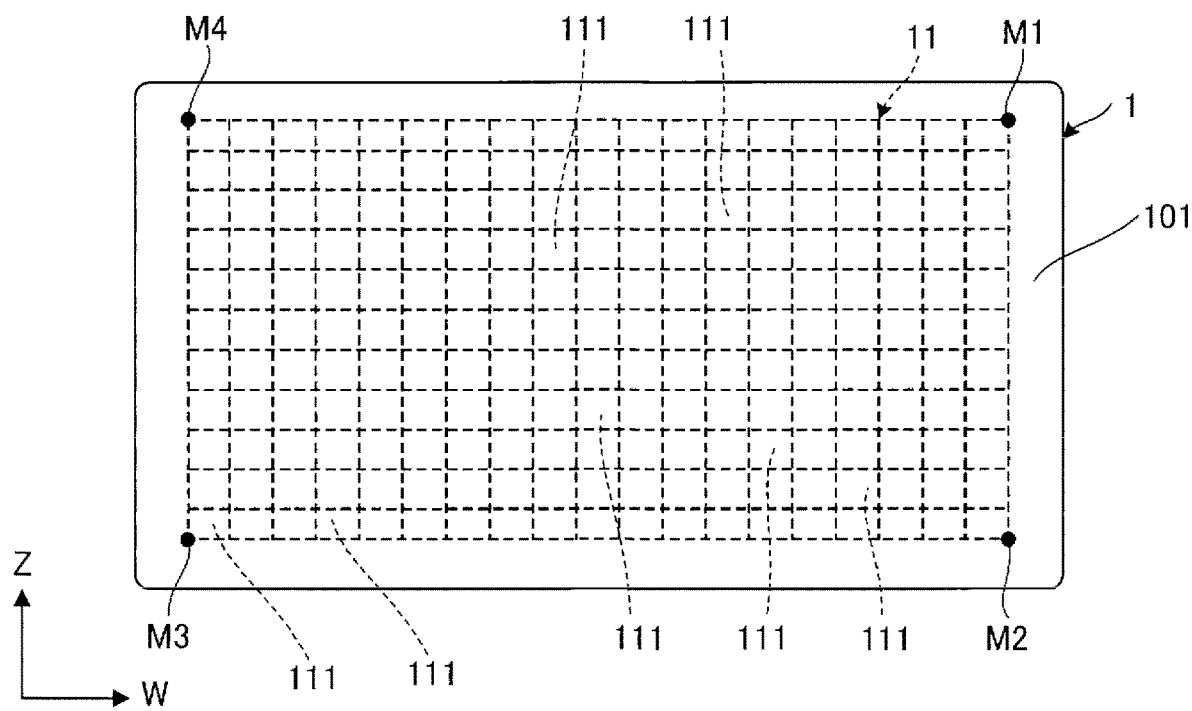
FIG. 3 describes a detection section provided in a screen in the first embodiment.

FIG. 3 describes the detection section 11 provided in the screen 1 shown in FIG. 1. The detection section 11 provided in the screen 1 includes a plurality of readers 111, as shown in FIG. 3. The readers 111 are each, for example, an electronic tag reader formed of an LSI (large scale integration) including an antenna and capable of communicating with the short-range wireless communication section 42 of the mobile terminal 4. The readers 111 can therefore communicate with an electronic tag having the communicable range of about several centimeters. When the mobile terminal 4 approaches the readers 111 to a point where the readers 111 are within the communicable range of the short-distance wireless communication section 42, the detection section 11 detects the situation in which the mobile terminal 4 has approached or come into contact with the screen 1.

The plurality of readers 111 are arranged in a matrix along the display surface 101 and disposed substantially across the display surface 101. The dotted-line outer frame shown in FIG. 3 represents the range of the plurality of readers 111 arranged in a matrix. The plurality of readers 111 are covered with a single cover, and the outer surface of the cover forms the display surface 101. The display coordinate system is set on the display surface 101, and the coordinates (w, z), which divide the display surface 101 into rows and columns, are set on the display surface 101. The plurality of readers 111 are disposed in correspondence with the coordinates (w, z) on the display surface 101.

The projection image 80 is so displayed as to correspond to the dotted-line outer frame. To this end, the calibration is performed. The calibration is performed, for example, as described below. First of all, markers M1 to M4 are provided at the four corners of the outer frame of the display surface 101. The image processing section 37 causes the projection section 32 to display a reference image specified in advance as the projection image 80 on the display surface 101. The reference image is, for example, a lattice image. The imaging section 31 captures an image of the reference image displayed on the display surface 101. The image captured by the imaging section 31 contains the markers M1 to M4. The control section 38 identifies the positions where the markers M1 to M4 are located in the captured image. The control section 38 produces a coordinate conversion equation representing the relationship between the display coordinate system and the imaging coordinate system based on the result of the identification.

The control section 38 further produces a coordinate conversion equation representing the relationship between the projection coordinate system and the imaging coordinate system based on the captured reference image. Specifically, the control section 38 produces the coordinate conversion equation representing the relationship between the projection coordinate system and the imaging coordinate system based on the positions of the lattice points in the captured reference image.

Further, the image processing section 37 may perform image processing that causes the four corners of the captured reference image to approach the positions of the markers M1 to M4.

A reader 111 in the vicinity of the mobile terminal 4, out of the plurality of readers 111, is communicably connected to the mobile terminal 4. The communicable connection between a reader 111 and the mobile terminal 4 means what is called pairing and refers to the state in which transmission and reception of information is allowed between the reader 111 and the mobile terminal 4. When communicably connected to the mobile terminal 4, the reader 111 outputs a detection signal representing that the mobile terminal 4 has been in the vicinity of the reader 111. The detection section 11 can determine the coordinates (w, z) of the mobile terminal 4 on the display surface 101 by identifying the reader 111 having outputted the detection signal, out of the plurality of readers 111, based on the detection signals to be outputted from the readers 111. Specifically, the detection section 11 has a table that stores identification information that allows unique identification of a reader 111 and the coordinates of the reader 111 with the identification information and the coordinate related to each other and acquires the terminal position P8 of the mobile terminal 4 by reading from the table the coordinates corresponding to the identification information on the reader 111 having outputted the detection signal.

Further, when communicably connected to the mobile terminal 4 over the short-distance wireless communication, the reader 111 receives terminal information from the mobile terminal 4. The terminal information contains the size of the mobile terminal 4, particularly, information on the size of the display screen of the mobile terminal 4, notification relating to an instruction of the image processing, which will be described alter, from the mobile terminal 4, and network information on how the mobile terminal 4 communicates over a network. The network information is information necessary for establishment of communicable connection that allows communication of a large-capacity data, such as object data, between the mobile terminal 4 and the projector 3 by paring the mobile terminal 4 and the projector 3 with each other by using, for example, Wi-Fi or Bluetooth. "Wi-Fi" and "Bluetooth" are each a registered trademark.

The detection section 11 is configured to be capable of transmitting the terminal information to the projector 3 via the network. The detection section 11 and the projector 3 may instead be connected to each other via a wire. The plurality of readers 111 described above may not be arranged in a matrix. Further, the plurality of readers 111 may not be disposed across the display surface 101 and may be disposed only on part thereof. The range over which the plurality of readers 111 are disposed overlaps or coincides with the projection image 80 displayed on the display surface 101.

1-2. Image Processing Method Carried Out by Projector

An example of the image processing method carried out by the projector 3 will next be described. The image processing described below includes a cutting process of cutting an object 801 from the projection image 80 and an attaching process of attaching the object 801 to the projection image 80. The image processing is achieved when the control section 38 reads and executes the image processing program 361 stored in the storage section 36 upon the user's operation performed on the operation section 34.

1-2A. Cutting Process

Figure 4:
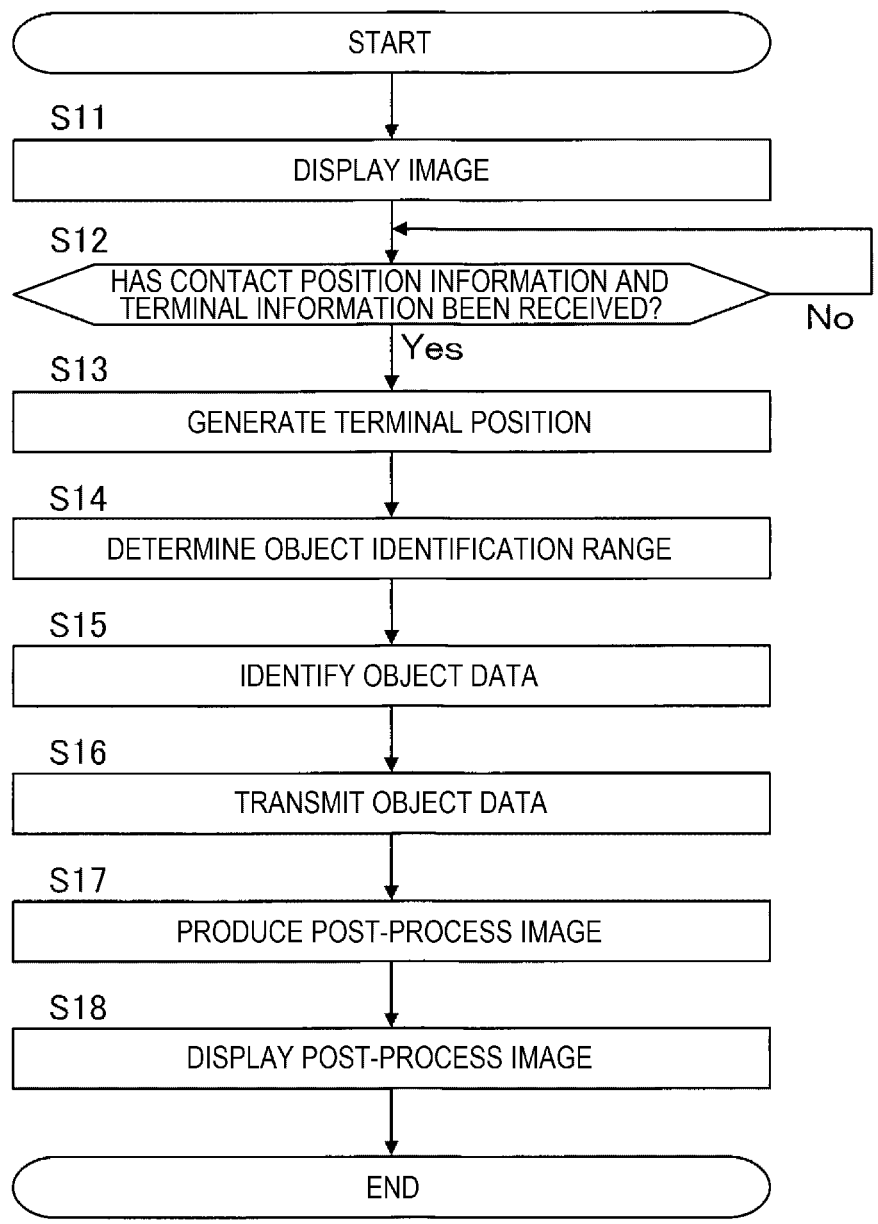
FIG. 4 is a flowchart for describing a cutting process of an image processing method in the first embodiment.

The cutting process of the image processing method will first be described. FIG. 4 is a flowchart for describing the cutting process of the image processing method in the first embodiment. The following description will be made with reference to the block diagram of FIG. 2, the flowchart of FIG. 4, and FIGS. 5 to 10.

In step S11 shown in FIG. 4, the projection section 32 displays the projection image 80 on the display surface 101.

Figure 5:
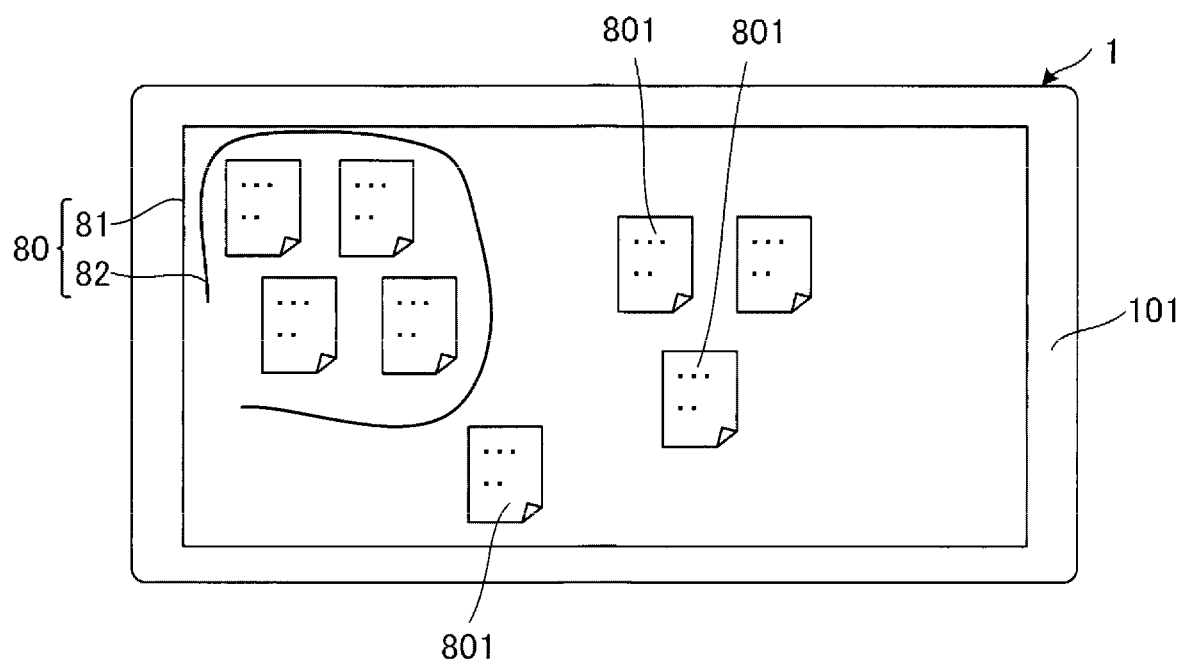
FIG. 5 shows a projection image in step S11.

FIG. 5 shows an example of the projection image 80 in step S11. The projection section 32 displays the projection image 80 on the display surface 101 when the light source driver 331 and the lens driver 334 are driven and the light valve driver 332 is driven based on the image signal produced by the image processing section 37 under the control of the projection controller 382. Further, under the control of the imaging controller 381, the imaging section 31 captures an image of the light outputted from the electronic pen 2 toward the display surface 101, and the pen position generator 383 generates the position of the tip of the pen in the projection coordinate system based on the position of the tip of the pen in the imaging coordinate system. The image data generator 386 then generates the display image data on the projection image 80 containing the trajectory of the electronic pen 2, and the projection section 32 displays the projection image 80 containing the trajectory of the electronic pen 2 on the display surface 101 in the same manner described above.

In step S12 shown in FIG. 4, the control section 38 evaluates whether the communication section 35 has received information on the contact position P1 of the mobile terminal 4 and the terminal information from the detection section 11 of the screen 1.

Figure 6:
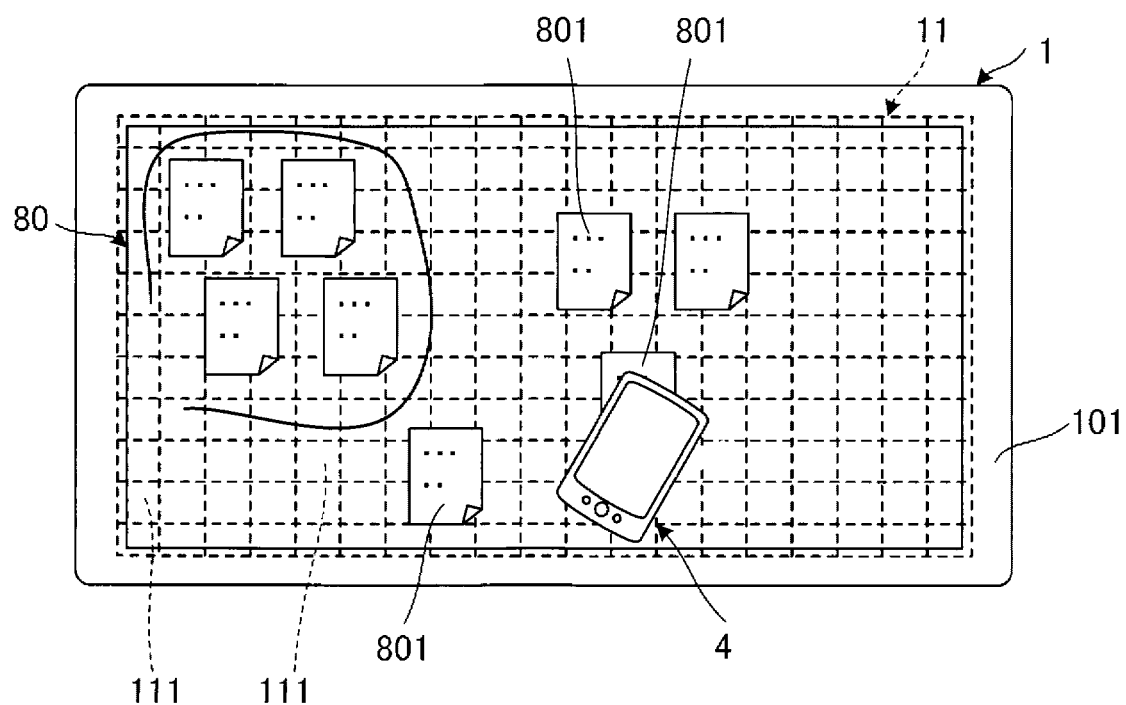
FIG. 6 shows the state in which a mobile terminal has approached or come into contact with a display surface in step S12.
Figure 7:
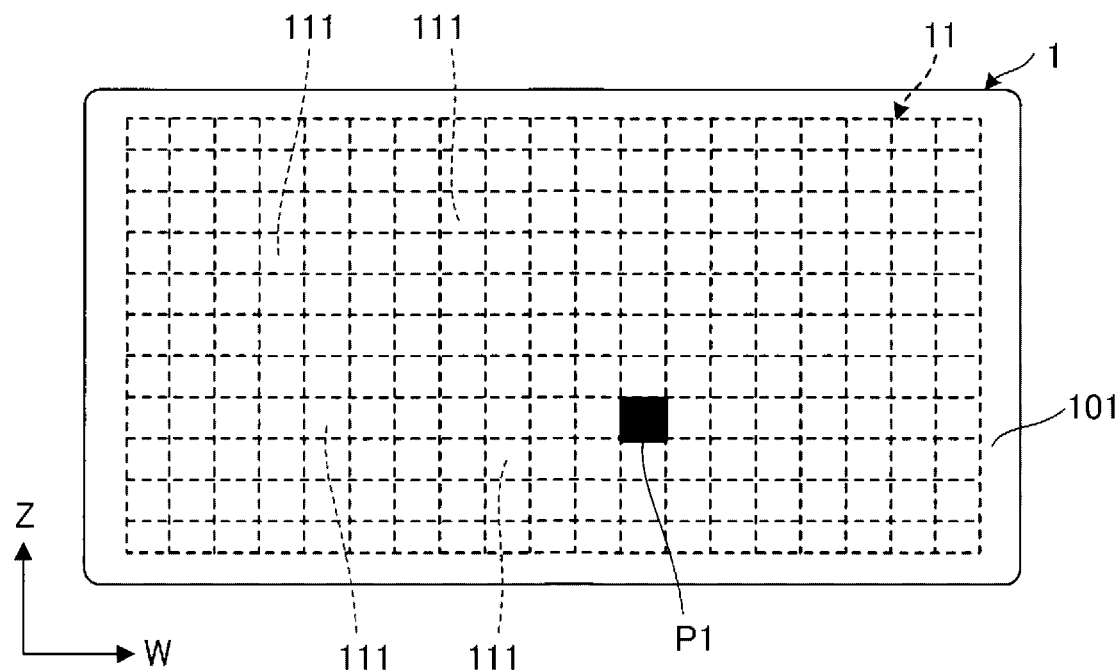
FIG. 7 shows the contact position of the mobile terminal on the display surface in step S12.

FIG. 6 shows the state in which the mobile terminal has approached or come into contact with the display surface in step S12. When the mobile terminal 4 has approached or come into contact with the display surface 101, as shown in FIG. 6, the reader 111 that the mobile terminal 4 has approached, out of the plurality of readers 111, is communicably connected to the mobile terminal 4. FIG. 7 shows the contact position P1 of the mobile terminal 4 on the display surface 101 in step S12. The detection section 11 identifies the reader 111 communicably connected to the mobile terminal 4 to determine the contact position P1 of the mobile terminal 4 in the display coordinate system. Specifically, the coordinates (w, z) of the contact position P1 are determined. The detection section 11 then transmits information on the contact position P1 and the terminal information received from the mobile terminal 4 via the short-distance wireless communication to the projector 3. The terminal information contains a transmission request to request transmission of the object data on the object 801 corresponding to the position of the mobile terminal 4.

In step S13 shown in FIG. 4, the terminal position generator 384 generates the terminal position information on the terminal position P8 based on the information on the contact position P1 of the mobile terminal 4 received in step S12.

Figure 8:
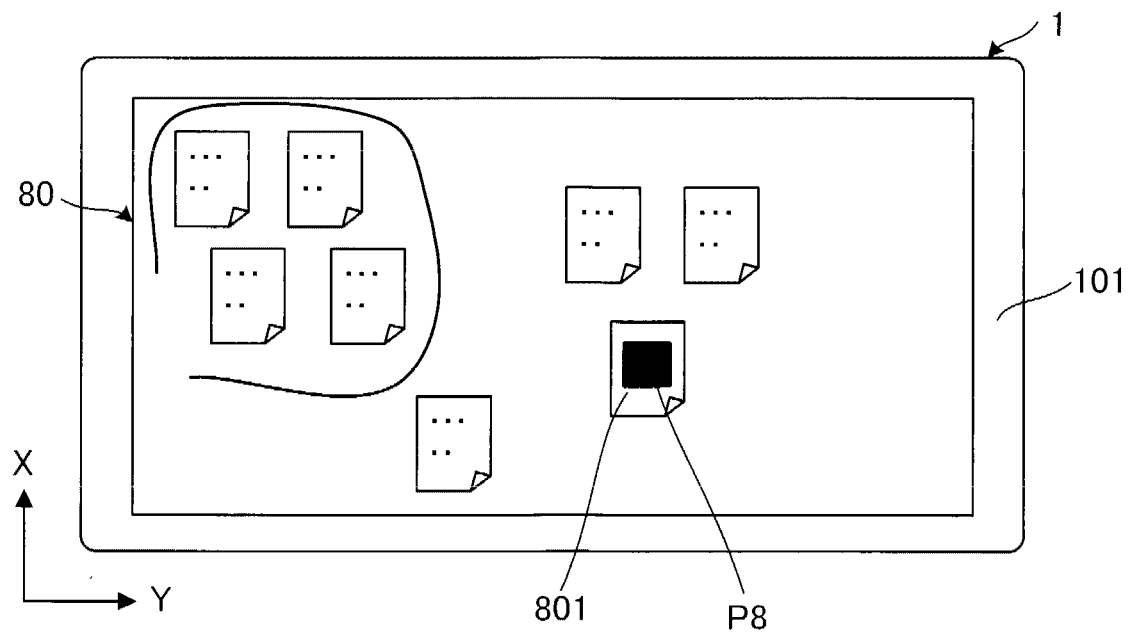
FIG. 8 shows the terminal position of the mobile terminal in the projection image in step S13.

FIG. 8 shows the terminal position P8 of the mobile terminal 4 in the projection image 80 in step S13. The terminal position generator 384 generates the terminal position P8 in the projection coordinate system shown in FIG. 8 based on the contact position P1 in the display coordinate system shown in FIG. 7. Specifically, the coordinate conversion equation for conversion between the coordinates (w, z) in the coordinate system of the display surface 101 and the coordinates (x, y) in the coordinate system of the projection image 80 is used to convert the coordinates (w, z) of the contact position P1 into the coordinates (x, y) of the terminal position P8.

In step S14 shown in FIG. 4, the object identifier 385 determines the object identification range A8 corresponding to the terminal position P8 generated in step S13.

Figure 9:
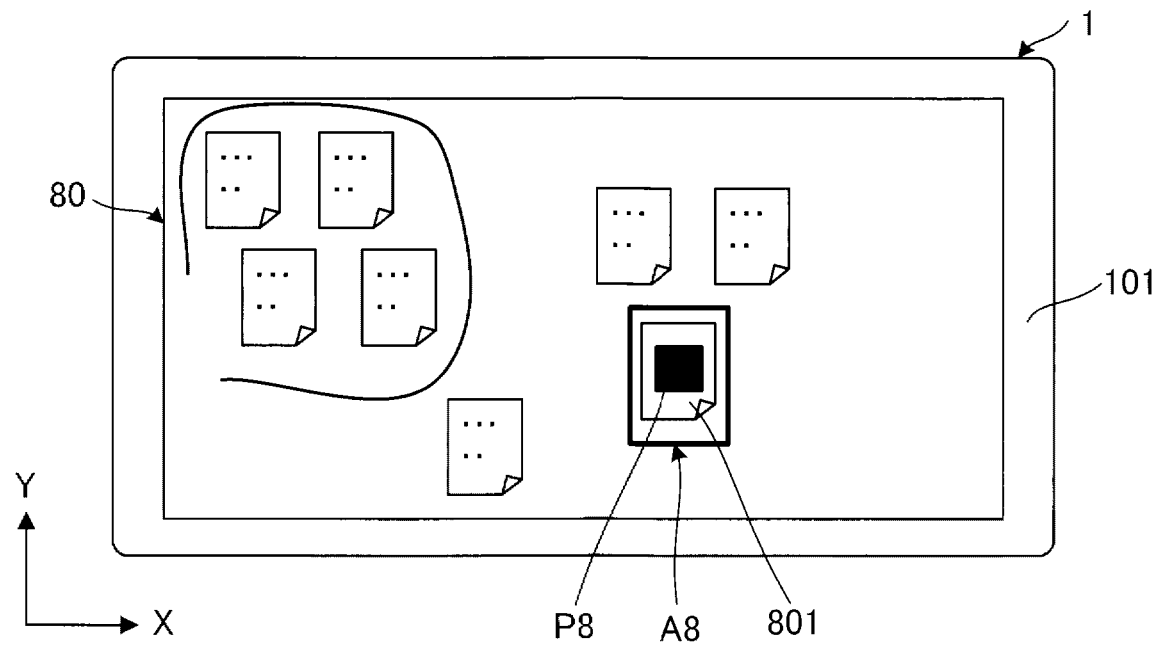
FIG. 9 shows an object identification range in step S14.

FIG. 9 shows the object identification range A8 in step S14. The object identifier 385 determines the object identification range A8 based on the size of the mobile terminal 4 received in step S12 and the terminal position P8 in the projection coordinate system generated in step S13. The object identification range A8 is so set around the terminal position P8, for example, that the size thereof is equal to the size of the mobile terminal 4. The size of the object identification range A8 is not necessarily set as described above and is arbitrarily set.

In step S15 shown in FIG. 4, the object identifier 385 identifies the object data on an object 801 located within the object identification range A8 determined in step S14. The object identifier 385 identifies the object data on an object that overlaps or coincides with the object identification range A8 based on the display image data.

In step S16, the communication section 35 transmits the object data identified in step S15 to the mobile terminal 4. The communication section 35 uses the network information contained in the terminal information to establish data communication, such as Wi-Fi and Bluetooth, with the network communication section 41 of the mobile terminal 4 and then transmits the object data to the mobile terminal 4. The communication section 35 establishes the data communication with the mobile terminal 4 in step S16 in the above description and may instead establish the data communication before step S16 and concurrently with steps S13, S14, and S15.

In step S17, the image data generator 386 generates post-cutting-process image data excluding the object data from the display image data on the projection image 80 based on the object data identified in step S15 and the display image data.

In step S18, the projection section 32 displays a post-cutting-process image 80a based on the post-cutting-process image data generated in step S16 on the display surface 101 under the control of the projection controller 382.

Figure 10:
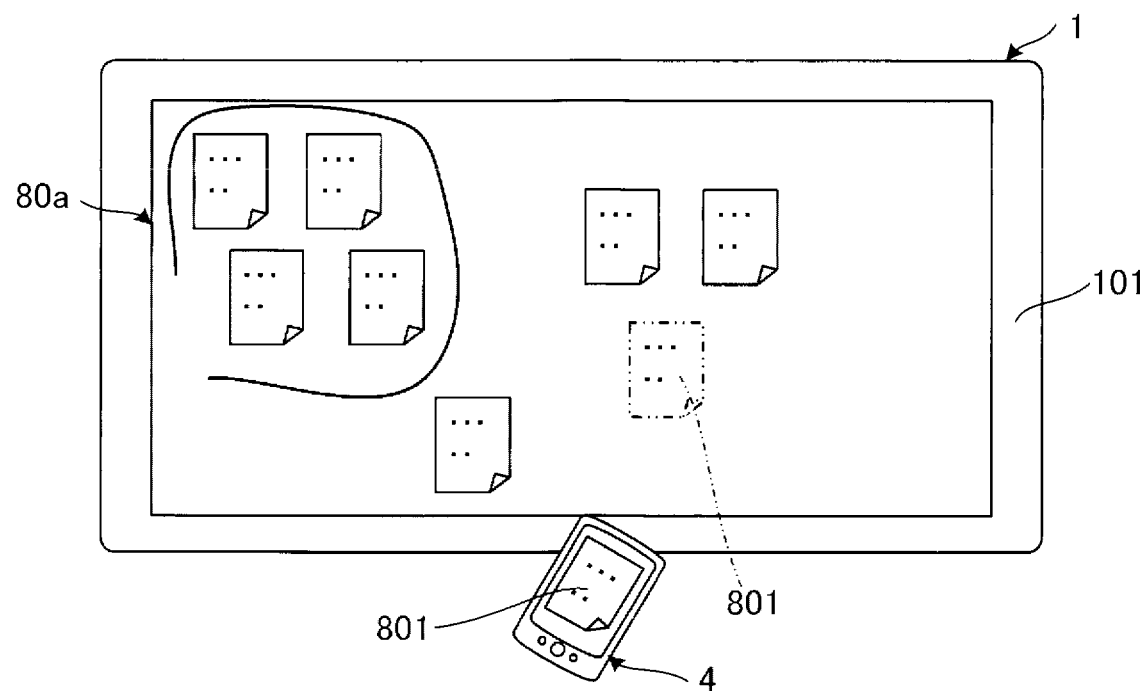
FIG. 10 shows a post-cutting-process image in step S18.

FIG. 10 shows the post-cutting-process image 80a in step S18. The projection section 32 displays the post-cutting-process image 80a on the display surface 101, and the object 801 is displayed on the mobile terminal 4. In the post-cutting-process image 80a, the object 801 corresponding to the object data transmitted by the mobile terminal 4 is removed. The object cutting process is thus completed.

1-2B. Attaching Process

Figure 11:
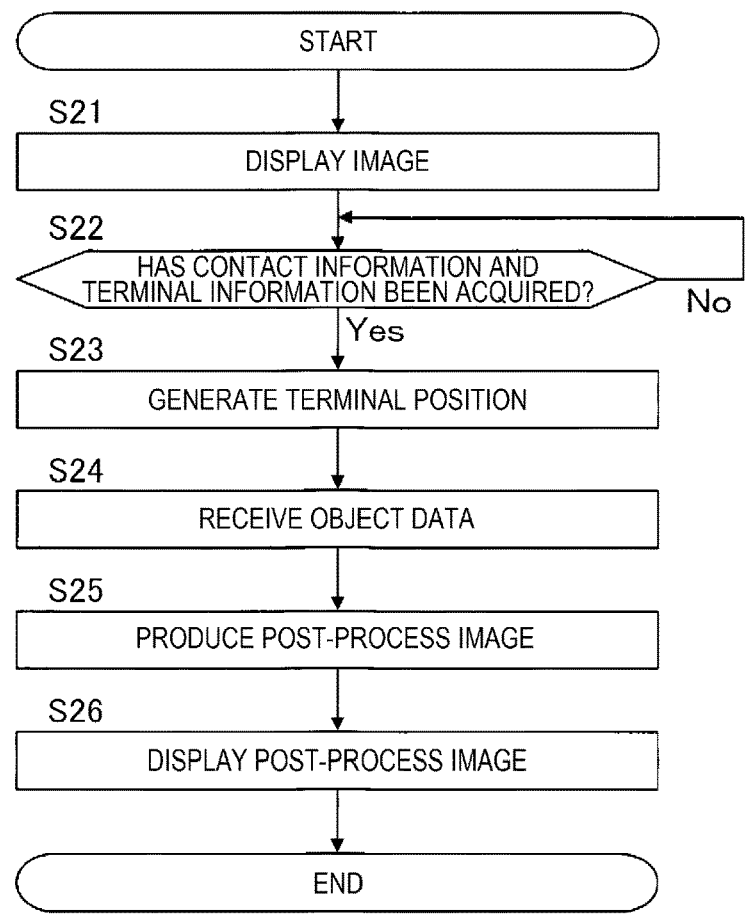
FIG. 11 is a flowchart for describing an attaching process of the image processing method in the first embodiment.

The attaching process of the image processing method will next be described. FIG. 11 is a flowchart for describing the attaching process of the image processing method in the first embodiment. The following description will be made with reference to the block diagram of FIG. 2, the flowchart of FIG. 11, and FIGS. 12 to 15. In the following description, the same contents as those in the cutting process described above are simplified.

In step S21 shown in FIG. 11, the projection section 32 projects the projection light LL to display a projection image 80b on the display surface 101.

In step S22, it is evaluated whether the communication section 35 has received the information on the contact position P1 of the mobile terminal 4 and the terminal information from the detection section 11 of the screen 1. The terminal information contains an attachment request to request attachment of the object 801 from the mobile terminal 4.

Figure 12:
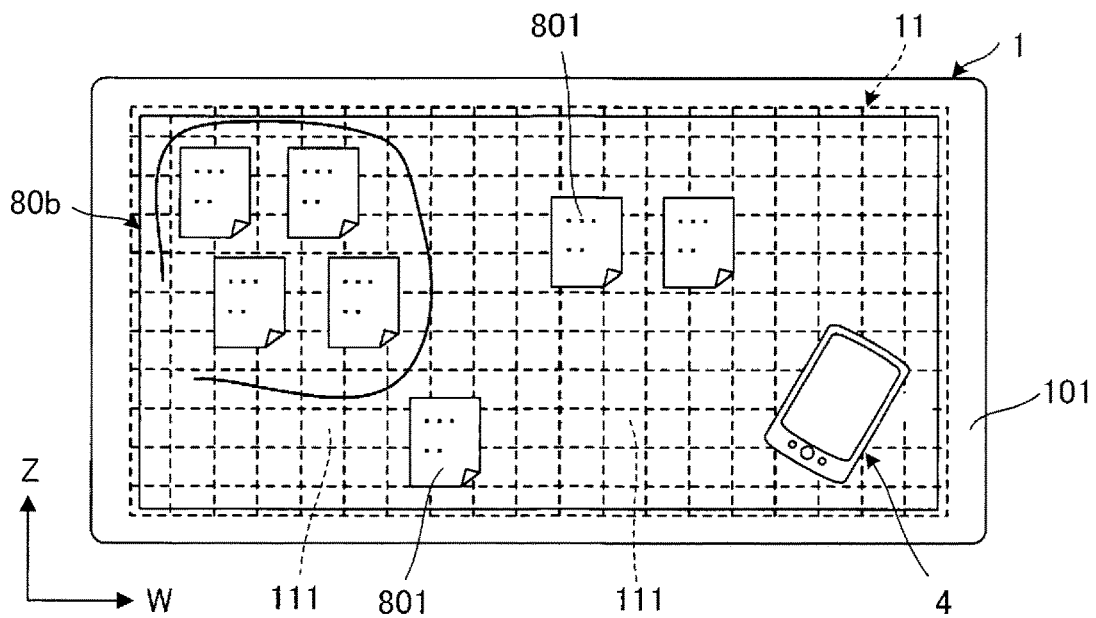
FIG. 12 shows the state in which the mobile terminal has approached or come into contact with the display surface in step S22.
Figure 13:
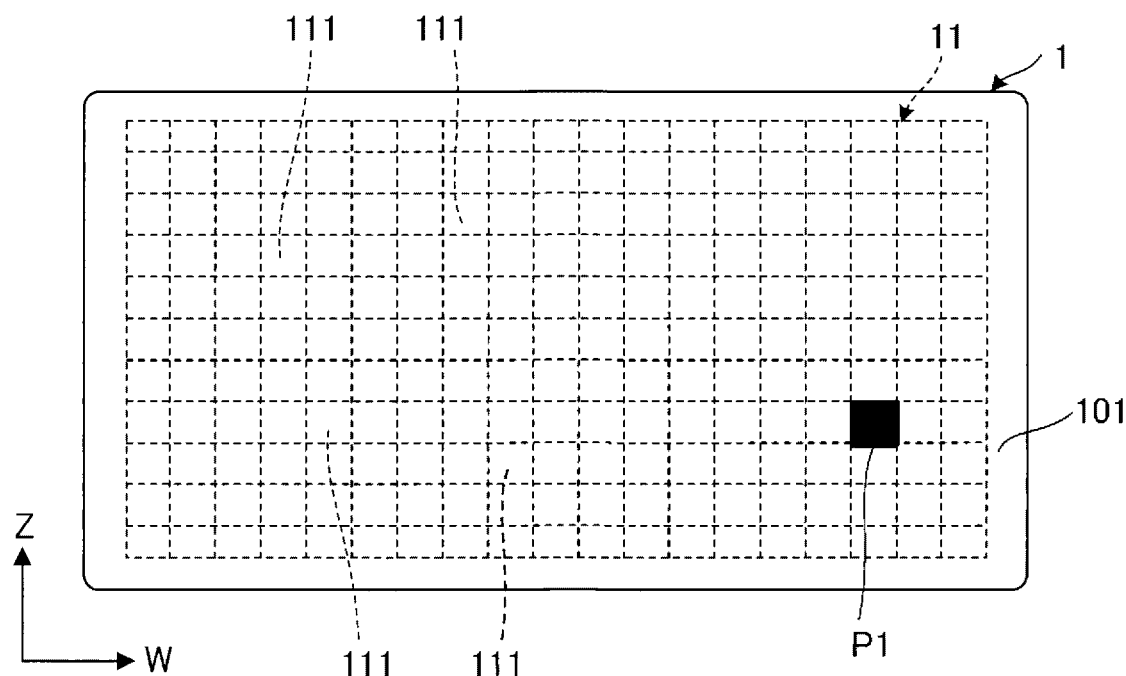
FIG. 13 shows the contact position of the mobile terminal on the display surface in step S22.

FIG. 12 shows the state in which the mobile terminal 4 has approached or come into contact with the display surface 101 in step S22. When the mobile terminal 4 has approached or come into contact with the display surface 101, as shown in FIG. 12, the reader 111 that the mobile terminal 4 has approached or come into contact with, out of the plurality of readers 111, establishes communication with the mobile terminal 4. FIG. 13 shows the contact position P1 of the mobile terminal 4 on the display surface 101 in step S22. The detection section 11 identifies the reader 111 communicating with the mobile terminal 4 to determine the contact position P1 of the mobile terminal 4 in the display coordinate system.

In step S23 shown in FIG. 11, the terminal position generator 384 generates the terminal position information on the terminal position P8 based on the information on the contact position P1 of the mobile terminal 4 received in step S22.

Figure 14:
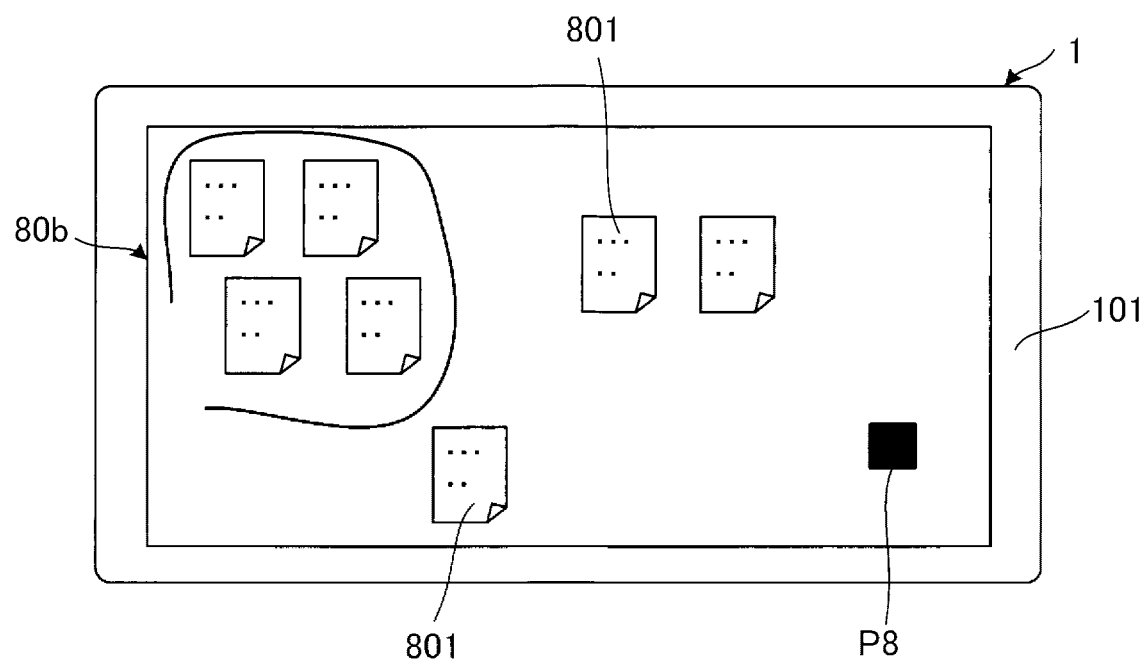
FIG. 14 shows the terminal position of the mobile terminal in the projection image in step S23.

FIG. 14 shows the terminal position of the mobile terminal 4 in the projection image 80b in step S23. The terminal position generator 384 generates the terminal position P8 in the projection coordinate system shown in FIG. 13 based on the contact position P1 in the display coordinate system shown in FIG. 12.

In step S24 shown in FIG. 11, the communication section 35 receives the object data identified in step S23 from the mobile terminal 4. The communication section 35 uses the network information contained in the terminal information to establish data communication, such as Wi-Fi and Bluetooth, with the network communication section 41 of the mobile terminal 4 and then receives the object data from the mobile terminal 4. The communication section 35 establishes the data communication with the mobile terminal 4 in step S25 in the above description and may instead establish the data communication before step S25 and concurrently with steps S23 and S24.

In step S25, the image data generator 386 generates post-attaching-process image data that is the image data on the projection image 80b to which the object data is added. The image data generator 386 generates the post-attaching-process image data based on the terminal position P8 generated in step S23, the object data received in step S24, and the display image data.

In step S26, the projection section 32 displays a post-attaching-process image 80c based on the post-attaching-process image data generated in step S25 on the display surface 101 under the control of the projection controller 382.

Figure 15:
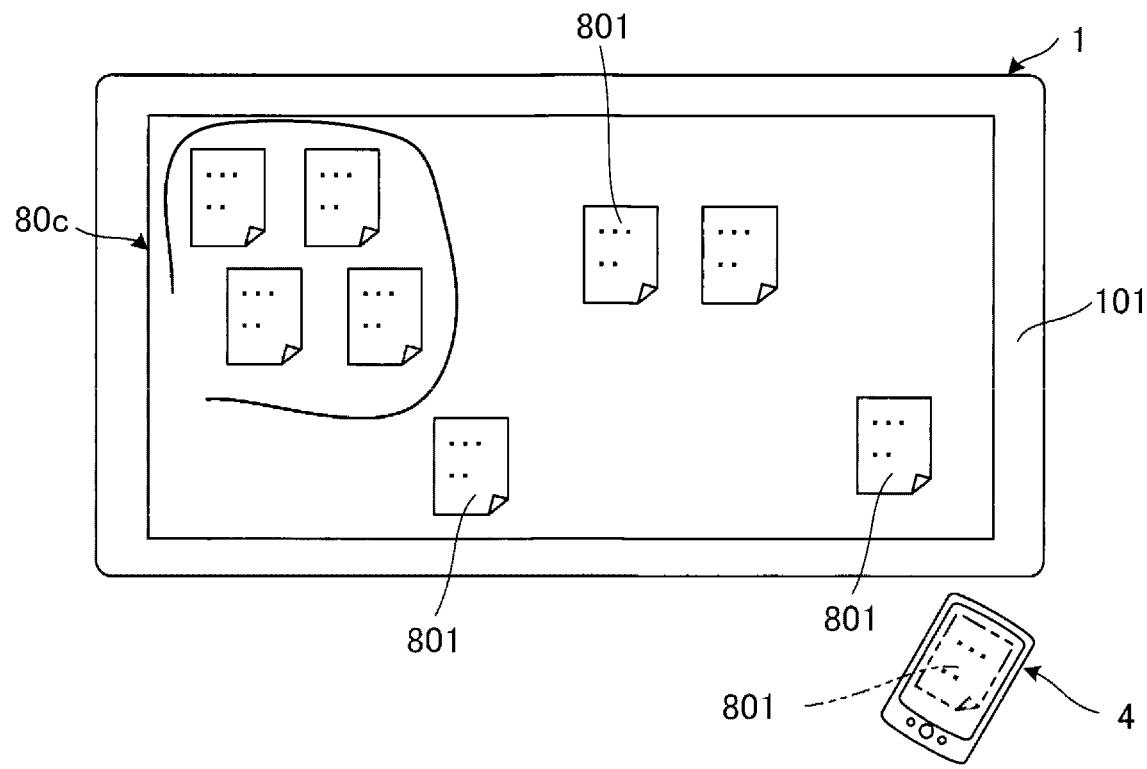
FIG. 15 shows a post-attaching-process image in step S26.

FIG. 15 shows the post-attaching-process image 80c in step S26. The projection section 32 displays the post-attaching-process image 80c on the display surface 101, and the object 801 is not displayed on the display screen of the mobile terminal 4. In the post-attaching-process image 80c, the object 801 corresponding to the object data received from the mobile terminal 4 is added. The object attaching process is thus completed.

An example of the configuration of the projector system 100 and the image processing performed by the projector system 100 has been described. As described above, the screen 1 and the projector 3, which are an example of the "display apparatus" are part of the projector system 100. The projector 3 includes the projection section 32 as the "display section," the terminal position generator 384 as the "position generator," the object identifier 385, and the communication section 35 having the function of the "transmitter." The projection section 32 displays the projection image 80 as the "image" containing one or more objects 801 based on the display image data on the display surface 101. The terminal position generator 384 generates information representing the position of the mobile terminal 4 having approached or come into contact with the display surface 101 as the terminal position information representing the terminal position P8 in the projection image 80. The object identifier 385 identifies the object data on an object 801 corresponding to the terminal position P8 based on the display image data and the terminal position information. The communication section 35 transmits the object data to the mobile terminal 4.

The thus configured projector 3 can identify an object 801 corresponding to the terminal position P8 in the projection image 80 and transmits the object data on the object 801 to the mobile terminal 4. Therefore, when one or more objects are displayed on the display apparatus, the mobile terminal 4 can acquire a desired object. That is, according to the present embodiment, the user can acquire the object data on the desired object 801 in the projection image 80 only by performing the action of causing the mobile terminal 4 to approach the desired object 801 on the display surface 101. In addition, an action similar to a sticky paper note detaching action can be achieved in an electronic environment, whereby the user's convenience of object data handling can be enhanced.

Further, in the present embodiment, the contact position P1 of the mobile terminal 4 in the projection image 80b can be converted into the terminal position P8 in the projection image 80b, and the object data received from the mobile terminal 4 can be displayed in the terminal position P8 in the projection image 80b. The user can therefore display the object 801 stored in the mobile terminal 4 in the projection image 80b only by performing the action of causing the mobile terminal 4 to approach a desired location on the display surface 101. That is, an action similar to a sticky paper note attaching action can be achieved in an electronic environment. The projector 3 can therefore achieve the convenience provided by a sticky paper note, such as detachment and attachment of a sticky paper note, in an electronic environment, whereby the user's convenience of object data handling can be enhanced.

The display apparatus includes the screen 1, as described above. The screen 1 includes the detection section 11, which detects the contact position P1, which is the position of the mobile terminal 4 on the display surface 101. The terminal position generator 384 described above converts the information representing the position of the mobile terminal 4 having come into contact with the display surface 101 and outputted from the detection section 11 into the terminal position information formed of the terminal position P8 based on the positional relationship between the display surface 101 and the projection image 80 displayed on the display surface 101.

Since the detection section 11 and the terminal position generator 384 provided in the projector system 100 allow the contact position P1 of the mobile terminal 4 on the display surface 101 to be converted into the terminal position P8 of the mobile terminal 4 in the projection image 80, coordinates in the display coordinate system can be converted into coordinates in the projection coordinate system. Since the display image data is specified in the projection coordinate system, the object identifier 385 can identify object data based on the display image data.

The detection section 11 detects the contact position P1 of the mobile terminal 4 on the display surface 101 through the short-distance wireless communication with the mobile terminal 4. That is, the detection section 11 includes the plurality of readers 111, and any of the readers 111 is communicably connected to the mobile terminal 4 over the short-distance wireless communication, whereby the detection section 11 detects the situation in which the mobile terminal 4 has been in the vicinity of or come into contact with the display surface 101. Using the readers 111 allows simple sensing of the state in which the mobile terminal 4 has been in the vicinity of or come into contact with the display surface 101. Using the readers 111 further allows reception of the terminal information on the mobile terminal 4 in addition to the detection of the state in which the mobile terminal 4 has been in the vicinity of or come into contact with the display surface 101. Effort of separate reception of the terminal information can thus be eliminated.

In the present embodiment, the detection section 11 may detect the contact of the mobile terminal 4 by using a method other than the method using the readers 111. For example, the detection section 11 can use a pressure sensitive sensor based on electrostatic capacitance that senses the contact between the display surface 101 and the mobile terminal 4 to detect the position of the mobile terminal 4 on the display surface 101. Using such a pressure sensitive sensor allows simple detection of the contact of the mobile terminal 4. When a pressure sensitive sensor is used, the screen 1 and the mobile terminal 4 may not be communicable with each other over short-distance wireless communication.

The image data generator 386 generates the post-cutting-process image data as "second display image data" excluding object data from the display image data, as described above. The projection section 32 as the "display section" displays the post-cutting-process image 80a as a "second image" excluding an object 801 corresponding to the terminal position P8 from the projection image 80 based on the post-process image data.

Displaying the post-cutting-process image 80a excluding the object 801 allows the user to intuitively understand that the object data on the object 801 has been cut off. The user can therefore recognize that the object data on the desired object has been transmitted to the mobile terminal 4.

The object identifier 385 determines the object identification range A8 corresponding to the terminal position P8 in accordance with the size of the mobile terminal 4 and identifies an object that overlaps or coincides with the object identification range A8.

Identification of the object identification range A8 allows identification of an object 801 over a wider range than in a case where no object identification range A8 is identified. Therefore, even if the user causes the mobile terminal 4 to imperfectly come into contact with an object 801, the object 801 can be precisely cut off.

The projector system 100 and the image processing in the present embodiment have been described. In the present embodiment, the mobile terminal 4 approaches one reader 111, and the mobile terminal 4 may instead come into contact with or approach a plurality of readers 111. That is, the detection section 11 may detect a situation in which the mobile terminal 4 has approached a plurality of readers 111.

2. Second Embodiment

Figure 16:
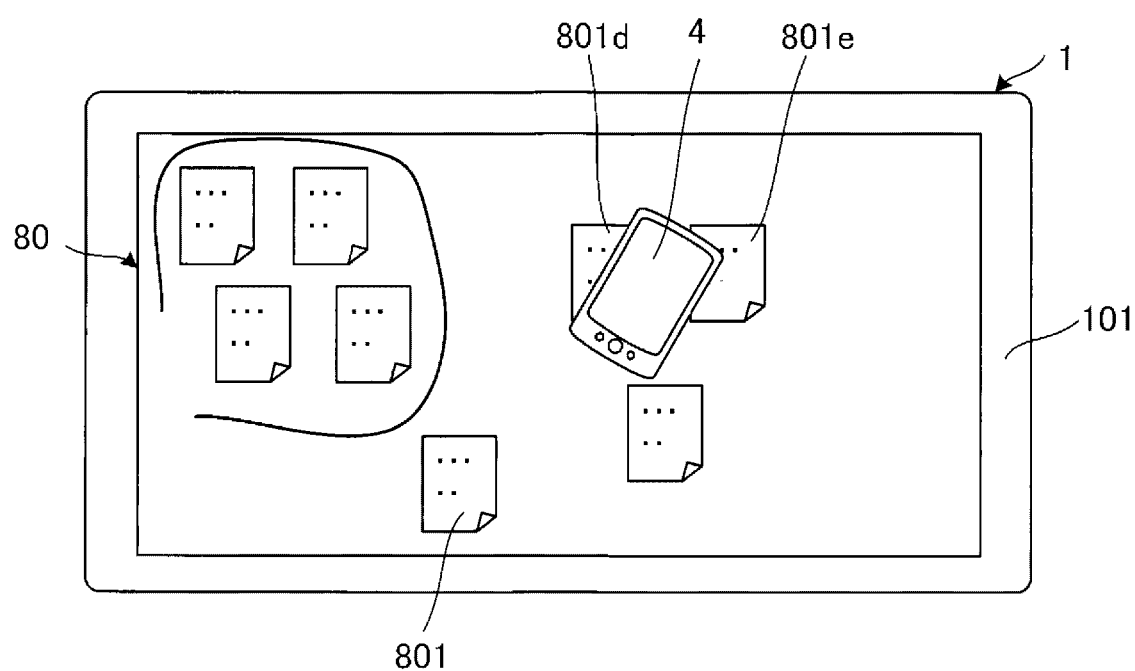
FIG. 16 shows the state in which the mobile terminal is in contact with the display surface in step S12 of the cutting process in a second embodiment.
Figure 17:
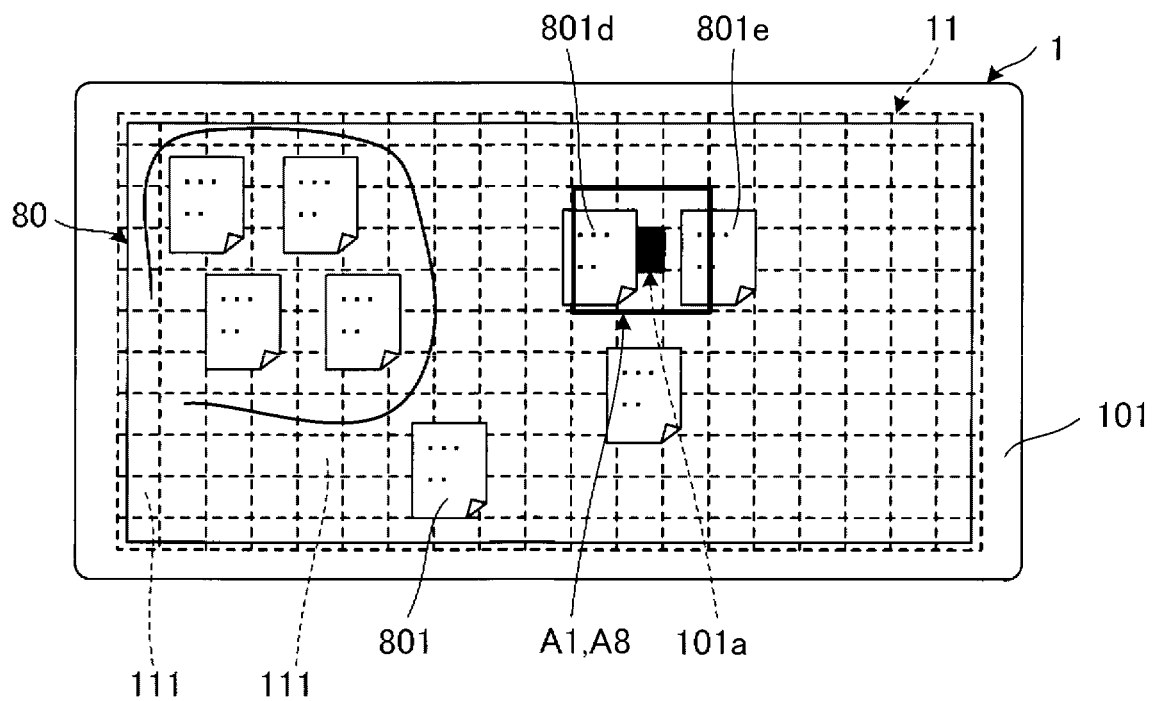
FIG. 17 shows the terminal position and the object identification range in step S13 of the cutting process in the second embodiment.
Figure 18:
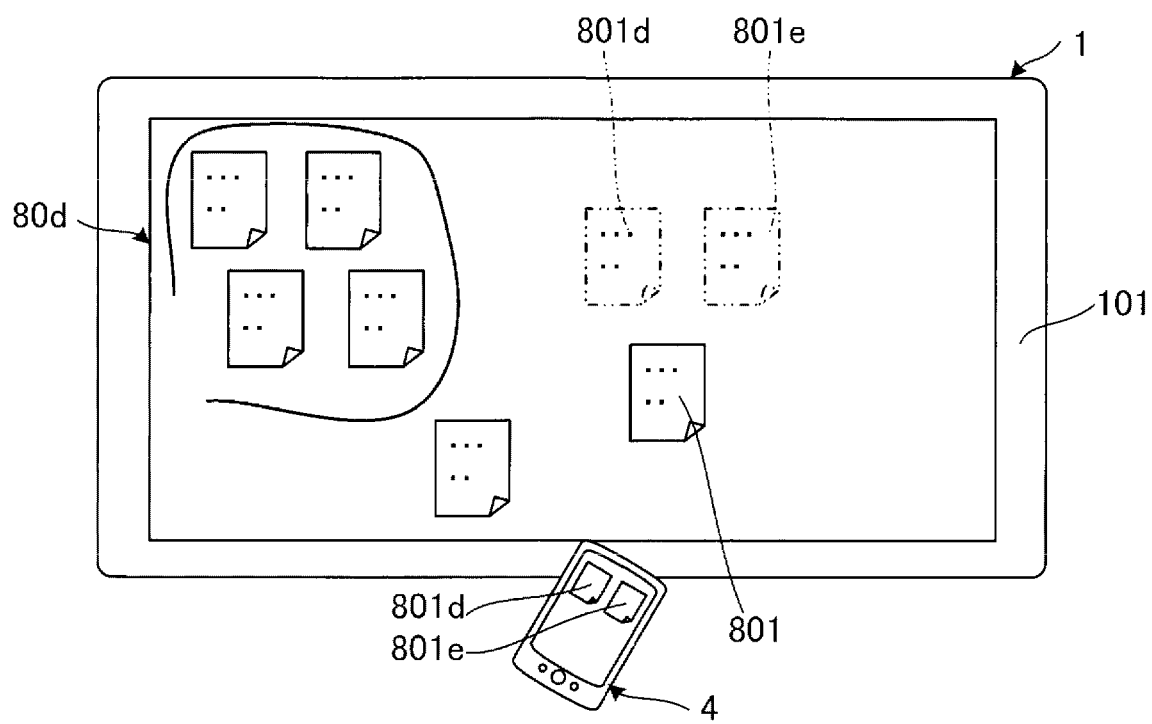
FIG. 18 shows a post-cutting-process image in step S17 of the cutting process in the second embodiment.

A second embodiment of the present disclosure will next be described. FIG. 16 shows the state in which the mobile terminal is in contact with the display surface in step S12 of the cutting process in the second embodiment. FIG. 17 shows the terminal position and the object identification range in step S13 of the cutting process in the second embodiment. FIG. 18 shows a post-process image in step S17 of the cutting process in the second embodiment.

The present embodiment is the same as the first embodiment except that a plurality of sets of object data are identified in the image processing. The following description of the second embodiment will be primarily made on the difference from the first embodiment, and the same items will not be described. In FIGS. 16, 17, and 18, the same configurations as those in the first embodiment have the same reference characters.

When the user causes the mobile terminal 4 to approach or come in contact with a plurality of objects 801, as shown in FIG. 16, the projector 3 transmits the object data on the plurality of objects 801 to the mobile terminal 4.

In step S15 of the cutting process, when a first object 801d and a second object 801e are located within the object identification range A8, as shown in FIG. 17, the object identifier 385 identifies one set of object data containing the first object 801d and the second object 801e. More specifically, the object identifier 385 generates third object data containing first object data on the first object 801d and second object data on the second object 801e and identifies the third object data as the object data. For example, when the first object 801d is a photograph and the second object 801e is a text, third object data containing the photograph and the text is generated.

In step S16, the communication section 35 transmits the third object data to the mobile terminal 4, and in step S17, the image data generator 386 generates post-cutting-process image data excluding the third object data. Thereafter, in step S18, the projection section 32 displays a post-cuttingprocess image 80d based on the post-cutting-process image data generated on the display surface 101, as shown in FIG. 18.

Transmitting the first object 801d and the second object 801e as one set of object data to the mobile terminal 4 allows the user to visually recognize the first object 801d and the second object 801e together on the display screen. Further, handling the first object data and the second object as one set of object data provides excellent convenience.

In step S15 of the cutting process, the object identifier 385 can instead separately identify the first object data on the first object 801d and the second object data on the second object 801e. Thereafter, in step S16, the communication section 35 transmits the first object data and the second object data to the mobile terminal 4.

Transmitting the first object 801d and the second object 801e as separate sets of object data to the mobile terminal 4 allows the user to use the first object 801d and the second object 801e separately.

Further, the object identifier 385 can select identification of the first object 801d and the second object 801e as one set of object data or identification of the first object 801d and the second object 801e as separate sets of object data. The object identifier 385 performs the selection when it receives an instruction from the user via the mobile terminal 4. The usability of object data for the user can therefore be increased.

The attaching process can be carried out in the same manner in which the cutting process described above is carried out.

Also in the present embodiment, an action similar to a sticky paper note detaching action can be achieved in an electronic environment, whereby the user's convenience can be enhanced, as in the first embodiment.

3. Third Embodiment

Figure 19:
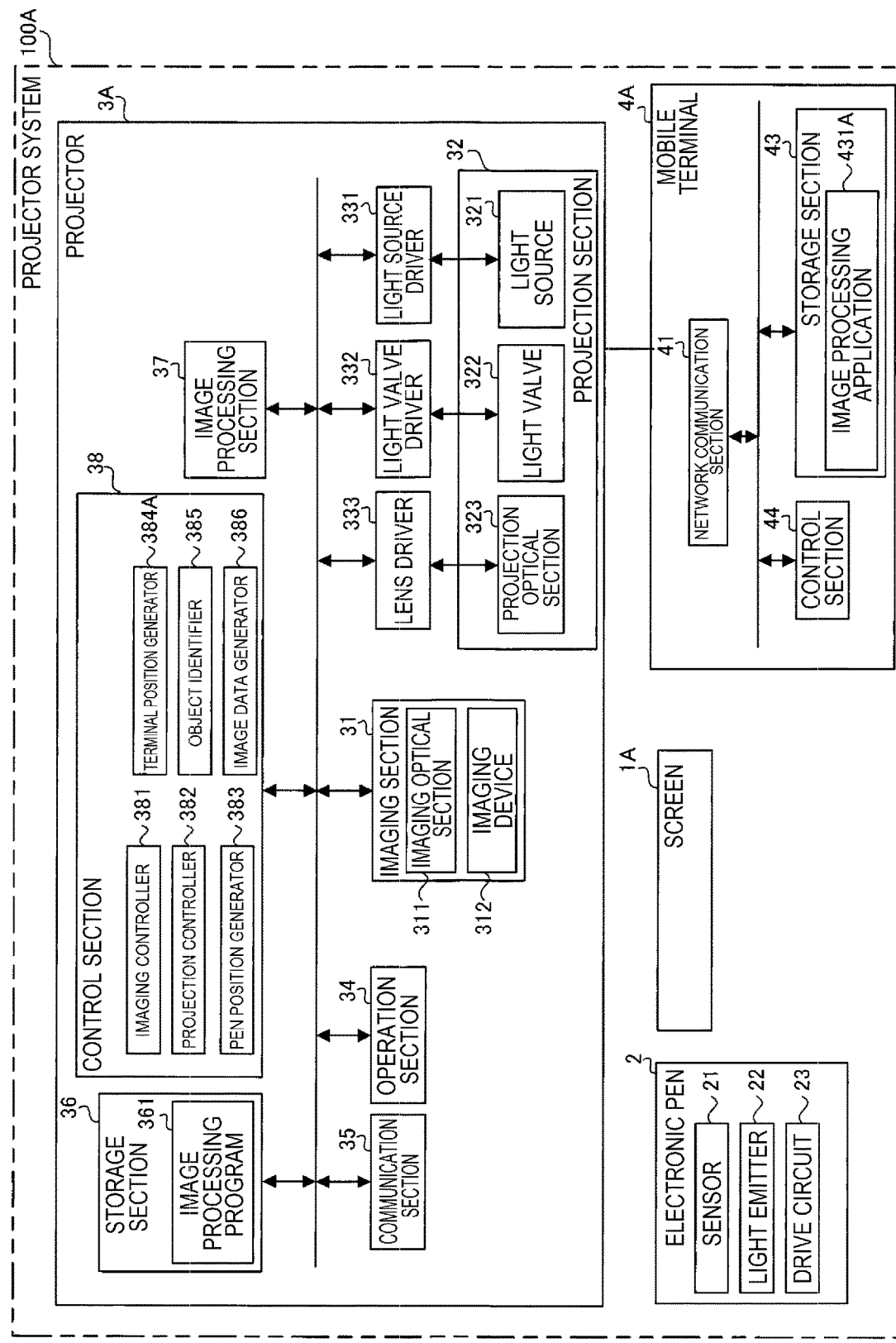
FIG. 19 is a block diagram showing a projector system in a third embodiment.
Figure 20:
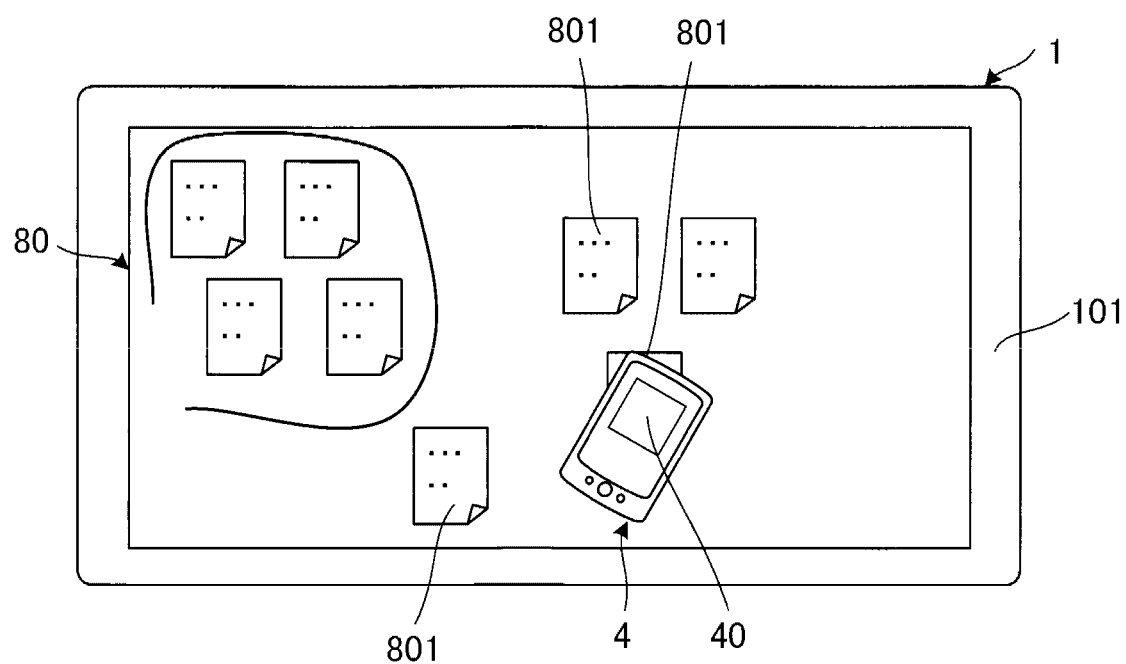
FIG. 20 describes the state in which the mobile terminal is in contact with the display surface in the third embodiment.

A third embodiment of the present disclosure will next be described. FIG. 19 is a block diagram showing a projector system according to the third embodiment. FIG. 20 describes the state in which the mobile terminal is in contact with the display surface in the third embodiment.

The present embodiment is the same as the first embodiment except that a projector 3A generates the terminal position P8 based on an image captured by the imaging section 31. The following description of the third embodiment will be primarily made on the difference from the first embodiment, and the same items will not be described. In FIGS. 19 and 20, the same configurations as those in the first embodiment have the same reference characters.

In a projector system 100A shown in FIG. 19, the imaging section 31 of the projector 3A captures an image of a mobile terminal 4A having approached or come into contact with the display surface 101. To capture an image of the mobile terminal 4A, the imaging section 31 is sensitive to the visible light wavelength region.

A terminal position generator 384A generates the terminal position P8 based on an image captured by the imaging section 31. Specifically, the terminal position generator 384A recognizes the image of the mobile terminal 4A being in the vicinity of or coming into contact with a screen LA and uses the coordinate conversion equation for conversion between the imaging coordinate system and the projection coordinate system to convert the position of the mobile terminal 4A in the captured image into the terminal position P8 in the coordinate system of the projection image 80.

When the control section 44 of the mobile terminal 4A executes an image processing application 431A, an instruction image 40 shown in FIG. 20 and representing the terminal information is displayed on the display screen of the mobile terminal 4A. The instruction image 40 is, for example, an image of a two-dimensional code, such as a QR code. The QR code is a registered trademark. The control section 38 of the projector 3A analyzes the instruction image 40 captured by the imaging section 31 to acquire the terminal information. For example, the terminal information is generated from the QR code. The mobile terminal 4A includes no short-distance wireless communication section 42, which is provided in the first embodiment.

The screen 1A shown in FIG. 19 has no detection section 11, which is provided in the first embodiment, and is formed, for example, of a hanging curtain or a whiteboard having the display surface 101.

In the present embodiment, since the terminal position P8 is generated based on the image captured by the imaging section 31, the terminal position P8 of the mobile terminal 4A can be generated even in the situation in which the mobile terminal 4A includes no short-distance wireless communication section 42 and the screen 1A has no detection section 11. In addition, the imaging section 31, which is used to perform the calibration, can also be used to generate the terminal position P8. Therefore, according to the present embodiment, when one or more objects are displayed on the display apparatus including the projection section 32 and the screen 1A, the mobile terminal 4A can acquire a desired object in the simple configuration. Also in the present embodiment, an action similar to a sticky paper note detaching action can be achieved in an electronic environment, whereby the user's convenience can be enhanced, as in the first embodiment.

4. Variations

The present disclosure is not limited to the embodiments described above, and a variety of variations, for example, those that will be described below, are conceivable. Further, one or more variations arbitrarily selected from the following aspects of variations can be combined with one another as appropriate.

4-1. Variation 1

In the embodiments described above, the projection section 32 and the screen 1 are presented as an example of the display apparatus, but the display apparatus is not limited thereto. For example, a display panel having a touch function may be used. The display panel can be a liquid crystal panel or an organic EL panel. In this case, when the mobile terminal 4 comes into contact with the display surface 101 of the display panel, the display panel outputs the contact position P1 of the mobile terminal 4 on the display surface 101. Since the contact position P1 represents a position in a displayed image, the contact position P1 coincides with the terminal position P8.

4-2. Variation 2

The object identifier 385 determines the object identification range A8 based on the size and the terminal position P8 of the mobile terminal 4, and the object identification range A8 may instead be the terminal position P8 itself. In this case, the object identifier 385 identifies object data containing the terminal position P8 within the display range of an object.

4-3. Variation 3

In the embodiments described above, the coordinate conversion equations are used to convert coordinates in the imaging coordinate system into those in the projection coordinate system and coordinates in the display coordinate system into those in the projection coordinate system, and any other method for the coordinate conversion may be employed. For example, a first table that stores the coordinates in the imaging coordinate system and those in the projection coordinate system with the coordinates in the two coordinate systems related to each other and a second table that stores the coordinates in the display coordinate system and those in the projection coordinate system with the coordinates in the two coordinate systems related to each other may be used to perform the coordinate conversion. In short, the terminal position generator 384 may convert the position of the mobile terminal 4 on the display surface 101 outputted from the detection section 11 into the terminal position P8 in the projection image 80 based on the positional relationship between the display surface 101 and the projection image 80 displayed on the display surface 101.

What is claimed is:

1. A display apparatus comprising:
   a display section that displays an image containing one or more objects based on display image data on a display surface;
   a processor and memory programmed to perform the following:
   generate information representing a position of a mobile terminal that comes into contact with the display surface as terminal position information representing a terminal position in the image; and
   identify object data on an object corresponding to the terminal position based on the display image data and the terminal position information; and
   a transmitter that transmits the object data to the mobile terminal,
   wherein when a first object and a second object are present in correspondence with the terminal position, the processor is programmed to generate third object data containing first object data on the first object and second object data on the second object and identify the third object data as the object data, and
   wherein the mobile terminal comes into contact with the one or more objects that are previously displayed on the display surface.

2. The display apparatus according to claim 1, the processor further programmed to perform the following:
   detect the position of the mobile terminal on the display surface,
   convert the information representing the position of the mobile terminal in contact with the display surface into the terminal position information based on a positional relationship between the display surface and the image displayed on the display surface.

3. The display apparatus according to claim 2,
   wherein the processor is programmed to detect the position of the mobile terminal on the display surface through short-distance wireless communication with the mobile terminal.

4. The display apparatus according to claim 2,
   wherein the processor is programmed to detect the position of the mobile terminal on the display surface by sensing the contact between the display surface and the mobile terminal.

5. The display apparatus according to claim 1, further comprising a camera configured to capture an image of the mobile terminal,
   wherein the processor is programmed to generate the terminal position based on an image captured by the camera.

6. The display apparatus according to claim 1, wherein processor is programmed to:
   generate second display image data excluding the object data from the display image data, and
   wherein the display section displays a second image excluding the object corresponding to the terminal position from the image based on the second display image data.

7. The display apparatus according to claim 1, wherein the processor is programmed to determine an object identification range corresponding to the terminal position in accordance with a size of the mobile terminal and identifies the object that overlaps or coincides with the object identification range.

8. The display apparatus according to claim 1, wherein the first object data and the second object data are combined.

9. An image processing method comprising:
   displaying an image containing one or more objects based on display image data on a display surface;
   generating information representing a position of a mobile terminal that comes into contact with the display surface as terminal position information representing a terminal position in the image; and
   identifying object data on an object corresponding to the terminal position based on the display image data and the terminal position information;
   wherein when a first object and a second object are present in correspondence with the terminal position, identifying first object data representing the first object and second object data representing the second object, and transmitting the first object data and the second object data, and
   wherein the mobile terminal comes into contact with the one or more objects that are previously displayed on the display surface.

10. A display apparatus comprising:
    a display section that displays an image containing one or more objects based on display image data on a display surface; and
    a processor and memory programmed to perform the following:
    generate information representing a position of a mobile terminal that comes into contact with the display surface as terminal position information representing a terminal position in the image; and
    identify object data on an object corresponding to the terminal position based on the display image data and the terminal position information;
    wherein when a first object and a second object are present in correspondence with the terminal position, the processor is programmed to identify first object data representing the first object and second object data representing the second object, and transmit the first object data and the second object data, and
    wherein the mobile terminal comes into contact with the one or more objects that are previously displayed on the display surface.

* * * * *